United States Patent [19]

Marsden

[11] Patent Number: 5,404,136
[45] Date of Patent: Apr. 4, 1995

[54] METHOD AND APPARATUS FOR MONITORING THE CONSUMPTION OF UTILITIES IN BUSINESS PREMISES

[76] Inventor: Derek R. Marsden, 15 South Croft, Grange Street, Alfreton, Derbyshire, DE5 7PN, United Kingdom

[21] Appl. No.: 659,346
[22] PCT Filed: Aug. 11, 1989
[86] PCT No.: PCT/GB89/00921
 § 371 Date: Feb. 19, 1991
 § 102(e) Date: Feb. 19, 1991
[87] PCT Pub. No.: WO90/02379
 PCT Pub. Date: Mar. 8, 1990

[30] Foreign Application Priority Data

Aug. 23, 1988 [GB] United Kingdom ................ 8820008
May 20, 1989 [GB] United Kingdom ................ 8911661

[51] Int. Cl.[6] .......................... G05B 23/02; H02J 3/14
[52] U.S. Cl. .......................... 340/870.03; 340/870.06; 340/825.15; 364/493; 307/39
[58] Field of Search ............ 340/870.03, 870.11, 340/870.06, 870.02, 870.05, 825.06, 825.15, 825.16; 324/142, 110; 307/31, 35, 39, 40; 346/144 MR; 364/481, 493; 379/107; 371/16.5, 24, 25.1, 28

[56] References Cited

U.S. PATENT DOCUMENTS

| | | | |
|---|---|---|---|
| 4,337,401 | 6/1982 | Olson | 307/39 |
| 4,489,386 | 12/1984 | Breddan | 307/35 |
| 4,510,398 | 4/1985 | Culp et al. | 307/35 |
| 4,727,315 | 2/1988 | Jones | 324/110 |

FOREIGN PATENT DOCUMENTS 0003010 7/1979 European Pat. Off. .
0244384 4/1987 European Pat. Off. ...... G01D 5/39

OTHER PUBLICATIONS

Control and Science and Technology for the Progress of Society, Proceedings of the Eighth Triennial World Congress of the International Federation of Automatic Control, Aug. 24–28, 1981, Kyoto, Japan, vol. 6, 1981, Pergamon Press, Y. Negoro et al.: "A Total Energy Management System for Industrial Plants Based on Optimization and Demand Forecasting Techniques," pp. 3213–3218.

Primary Examiner—John K. Peng
Assistant Examiner—Andrew Hill
Attorney, Agent, or Firm—W. Thad Adams, III

[57] ABSTRACT

The invention is an apparatus and method for monitoring the consumption of utilities in business premises. The premises are divided into notional zones, each including a utility load and a meter to record consumption within the zone. The zones are combined into notional groups. A central analysis computer is provided for receiving consumption data from the zones of a group to calculate total utility consumption within the group, and to conduct further analysis on the consumption data. The computer also supplies control data to the zones for controlling utility consumption. A single loss monitoring device records the total losses which occur between a point and the utility loads in the zones. The loss monitoring device transfers this information to the computer. Alternatively, a separate loss monitoring apparatus is supplied for each column of zones for determining the losses which occur in any single column of zones.

18 Claims, 4 Drawing Sheets

GRID REF.(Z,X,Y)

METHOD AND APPARATUS FOR MONITORING THE CONSUMPTION OF UTILITIES IN BUSINESS PREMISES

TECHNICAL FIELD AND BACKGROUND OF THE INVENTION

The present invention relates to utility metering.

The use of utilities has hitherto been metered by the utility supplier, in order to ensure that the consumer (whether industrial or domestic) is correctly charged for any utility supplied to the consumer's premises.

The present invention seeks to enable the use of utility metering data by the consumer, especially industrial consumers, to allow the consumer to ensure greater efficiency in the use of the utilities.

SUMMARY OF THE INVENTION

According to the invention, there is provided a method of monitoring the consumption of utilities business premises, in which the premises are notionally divided into zones, each of which contains at least one utility load to be supplied, and characterized in that utility metering means are associated with each zone, to record consumption within the associated zone, the zones are notionally combined into groups, each group including all of those zones which contribute to the provision of a specified product or service, and analysis means are provided in relation to each group, and are used to:

(i) Receive utility consumption data relating to the zones of that group and to combine the received data to provide data concerning the total measured utility consumption within that group;

(ii) Store asset data relating to the zones of that group and concerning the expected utility consumption within each of the zones under each of a set of operating conditions, and combine asset data relating to the zones of that group to provide data concerning the total expected utility consumption within that group, (iii) Compare the total expected utility consumption data with the total measured utility consumption data; and (iv) Supply control data to a zone or zones within that group to enable utility consumption to be controlled in dependence on the result, of the comparison.

Preferably the zones are notionally combined by providing the analysis means with data identifying the zones which constitute each group. The identifying data may preferably be changed, whereby the groups may be re-organized.

Each zone may include loads For a plurality of utilities, and the utility metering means associated with each zone may record the consumption of each utility within the associated zone. The analysis means may be used to separately combine data relating to the consumption of each utility within each group of zones, to provide data relating to the total consumption of each utility within each group.

The analysis means may be used to combine all data relating to consumption of any utility within each group of zones, to provide data relating to the total utility consumption off each group. The analysis means may be operable to combine consumption data with tariff data to provide cost data relating to utility consumption costs.

There may further be provided additional utility metering means used to record quantities of a utility supplied to a zone or zones, and the analysis means may be used to compare the quantity of the utility supplied to the zone or zones and the measured utility consumption within that zone or those zones, to detect losses. The detected losses may be apportioned to the zones in which the losses occur, in proportion to the measured consumption within those zones, the apportioned losses being thereafter considered as additional consumption within the zones to which the losses are apportioned.

The invention also provides apparatus for monitoring the consumption of utilities in business premises notionally divided into zones each containing at least one utility load to be supplied, characterized in that the apparatus comprises utility metering means associated with each notional zone of the premises and operable to record consumption within the associated zone, and analysis means operable to analyze consumption data relating to the zones of groups of zones, into which the zones are notionally divided, each notional group including all of those zones which contribute to the provision of a specified product or service, and in that the analysis means are further operable in relation to each group to:

(i) Receive utility consumption data relating to the zones of that group and to combine the received data to provide data concerning the total measured utility consumption within that group;

(ii) Store asset data relating to the zones of that group and concerning the expected utility consumption within each of the zones under each of a set of operating conditions, and combine asset data relating to the zones of that group to provide data concerning the total expected utility consumption within that group, (iii) Compare the total expected utility consumption data with the total measured utility consumption data; and (iv) Supply control data to a zone or zones within that group to enable utility consumption to be controlled in dependent on the result of the comparison.

Preferably the analysis means comprise means for storing data identifying the zones which are notionally combined to constitute each group. The identifying data may preferably be changed, whereby the groups may be re-organized.

Each zone may include loads for a plurality of utilities, the utility metering means associated with each zone recording the consumption of each utility within the associated zone. The analysis means may be operable to separately combine data relating to the consumption of each utility within each group of zones, to provide data relating to the total consumption of each utility within each group. The analysis means may be operable to combine all data relating to consumption of any utility within each group of zones, to provide data relating to the total utility consumption of each group. The analysis means may be operable to combine consumption data with tariff data to provide cost data relating to utility consumption costs.

There are preferably provided additional utility metering means operable to record quantities of a utility supplied to a zone or zones, and the analysis means may be operable to compare the quantity of the utility supplied to the zone or zones and the measured utility consumption within that zone or those zones, to detect losses. Preferably the analysis means is operable to apportion detected losses to the zones in which the losses occur, in proportion to the measured consumption within those zones, the apportioned losses being thereafter considered as additional consumption within the zones to which the losses are apportioned.

BRIEF DESCRIPTION OF THE DRAWINGS

Proposals for the implementation of the present invention will now be described in more detail, by way of example only, and with reference to the accompanying drawings in which.

DESCRIPTION OF THE PREFERRED EMBODIMENT AND BEST MODE

Figure 1:
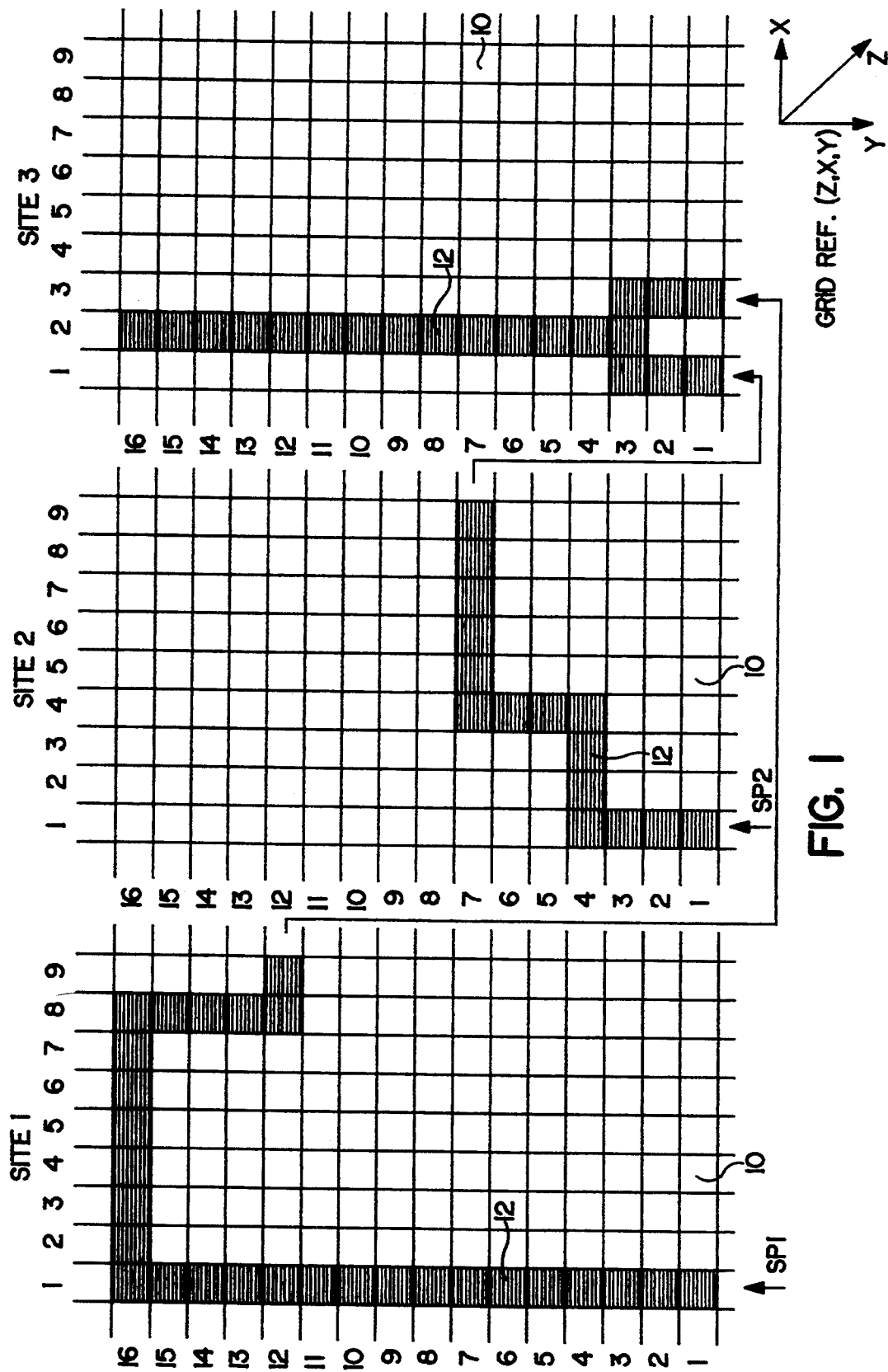
FIG. 1 is a schematic representation of a business premises on three sites.

FIG. 1 schematically represents the premises of a business having three sites of operation. Each site is divided notionally into a series of zones 10, shown for convenience as square zones on a grid of 9 columns and 16 rows. Each zone includes at least one machine or other utility load (not shown in FIG. 1). Zones are notional only, and are therefore not necessarily square, nor are they necessarily all of equal shape or size. Each zone has associated with it utility metering means (not shown in FIG. 1) for metering the consumption of utilities within that zone.

Figure 2:
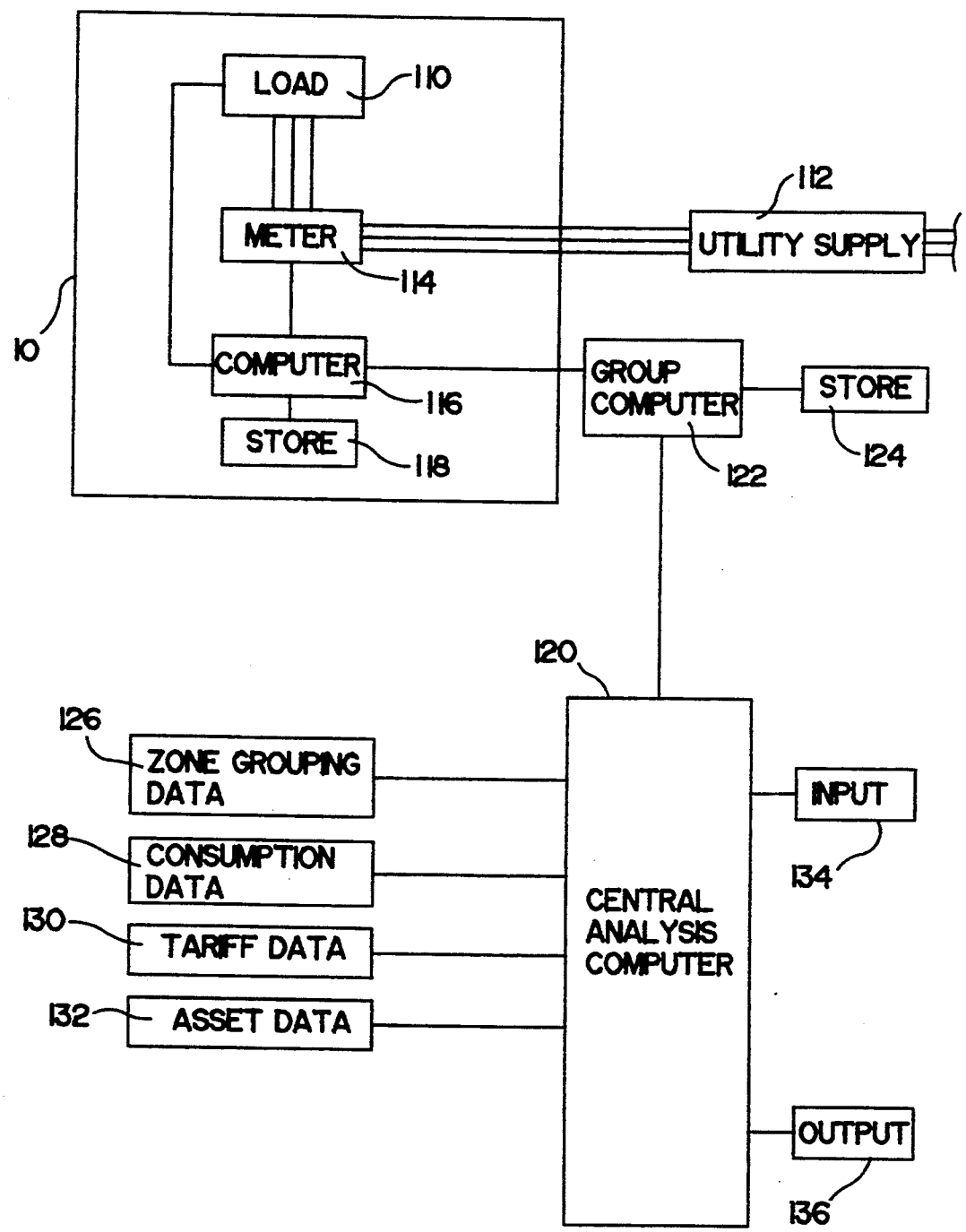
FIG. 2 shows one zone in more detail.

A zone 10 is shown in more detail in FIG. 2. The zone includes one or more utility loads 110, such as machines. These are supplied with utilities from a utility supply 112 through utility metering means 114. FIG. 2 shows the utility supply 112 supplying three utilities, but different numbers of utilities could be supplied in practice, and each load 110 may not require all of the utilities supplied to the zone 10.

The meter 114 is connected to a computer 116 local to the zone and which has an associated store 118 for recording metered consumption data produced by the meter 114.

The computer 116 is also connected to the load 110 to allow the computer 116 to control the load 110, such as by setting the maximum operating level of the load 110.

In common with the computers in all other zones, the computer 116 is in communication with a central analysis computer 120. Communication may be direct, or may be through a group computer 122 in communication with computers in several zones, to provide a buffer between the computers 116 and the central computer 120. The group computer 122 may have associated memory 124 to facilitate its use as a buffer.

Communication between the computer 120 and the computers 116 is two-way, so that the computer 120 may receive consumption data From the zones, and may send control data to the zones to control consumption in dependence on the result of the analysis carried out by the computer 120, to be described.

Associated with the central analysis computer 120, are various stores of data for use in the analysis. Zone grouping data is stored at 126 to identify the selection of zones 10 which are to be treated as a group for the purposes of the analysis. A store 128 is used by the central computer 120 for storing metered consumption data received from the zones. The store 128 may store raw data and also processed data.

Tariff data is stored at 130 to allow the computer to determine the cost of the utilities consumed, by combining tariff data and consumption data.

Asset data is stored at 132 and concerns the expected utility consumption within each zone 10 under each of a set of operating conditions (such as full load, partial load etc.). Appropriate input devices are provided at 114 to allow the computer 120 to be controlled, and also to allow data stored at 126, 130 and 132 to be modified as required. Appropriate output means are provided at 136 for the output of the results of the analysis.

The apparatus has been shown highly schematically in FIG. 2 to indicate that many variations are possible in the practical implementation of a system like the one described. Many aspects will depend on particular choices of hardware and may also depend on other factors of the operating conditions.

Returning to FIG. 1, the grey shading 12 indicates the notional combining of zones into groups, each group including all of those zones which contribute to the provision of a specific product or service. In the example shown, site 3 is responsible for finishing the manufacture of a product which is made from sub-products manufactured at site 1 and at site 2, respectively. Raw materials for one sub-product enter site 1 at zone (1, 1) (indicated by the arrow SP1) and proceed along the shaded line of zones until leaving site 1 from zone (9, 12). The first sub-product then enters site 3 at zone (3, 1).

Raw materials for the second sub-product enter site 2 at zone (1, 1) (indicated by the arrow SP2) and leave at zone (9, 7) to enter site 3 at zone (1, 1). The two sub-products are combined at zone (2, 3) of site 3 and are further processed into the finished product which is ready to leave site 3 from zone (2, 16).

The utility metering means 114 associated with each zone of the 3 sites continuously produces consumption data for the or each utility consumed in the zone and this data may be stored or passed to the central analysis means (the computer 120). Consumption data is preferably sent with other information which characterizes that data. The characterizing information may indicate the following:

(a) The date and time on which the consumption data is collected.
(b) The site in which the zone is located.
(c) Identification of any product of which the product manufactured at the zone constitutes a sub-product.
(d) Identification of personnel responsible for the operation of machinery or other utility loads in the zone. Personnel may be identified at several layers of a management structure.
(e) Identification of the zone from which the data was collected.
(f) Identification of a part of the zone from which the data was collected, if desired.
(g) Whether the utility load in the zone was operating at the time or data collection.

Data included in each batch transmitted to or from the zone may include the following sorts of data:

a) Data transmitted from the central computer 120 to the computer 116 associated with a particular zone.
b) Data transmitted from the zone to the central computer 120, including utility consumption data.

c) Instructions sent to the zone computer 116 from the central computer 120, such as instructions to control the rate of operation of a machine, or instructions to turn a machine on or off.

Information of this type received from all the zones of all the sites of the business can be analyzed by the computer 120 in many different ways, by selecting some or all of the constituents of the data. For instance, data relating to electricity consumption in each zone of the group of zones used for the manufacture of a particular product can be added together to provide a figure for the total electricity consumption associated with the production of that product. Similar calculations can be conducted in relation to other utilities, or the total consumption of all utilities for that group can be calculated to provide a figure for the total cost of utility consumption as an overhead in the production of that product.

As has been described, the analysis means 120 has a store containing asset data. This asset, data gives the expected utility consumption in the associated zone according to parameters such as the rate of operation of machinery, or the rate of throughput of products. By performing similar operations on the asset data and the consumption data, it is possible for the analysis means 120 to make a comparison bet, ween the predicted consumption which should be occuring, and the consumption which is actually occuring. This allows an early warning to be given if the actual consumption strays significantly from the expected consumption. The analysis means 120 is able to send instructions back to the zones in order to control machinery and modify the consumption in order to increase the efficiency of utility consumption, if any inefficiencies are detectable from these comparisons.

It is also possible to provide predictions of expected utility consumption in selected conditions of operation of the utility loads. This facility provides a helpful management tool by enabling the effects of proposed changes in the production techniques to be studied in advance.

Figure 3A:
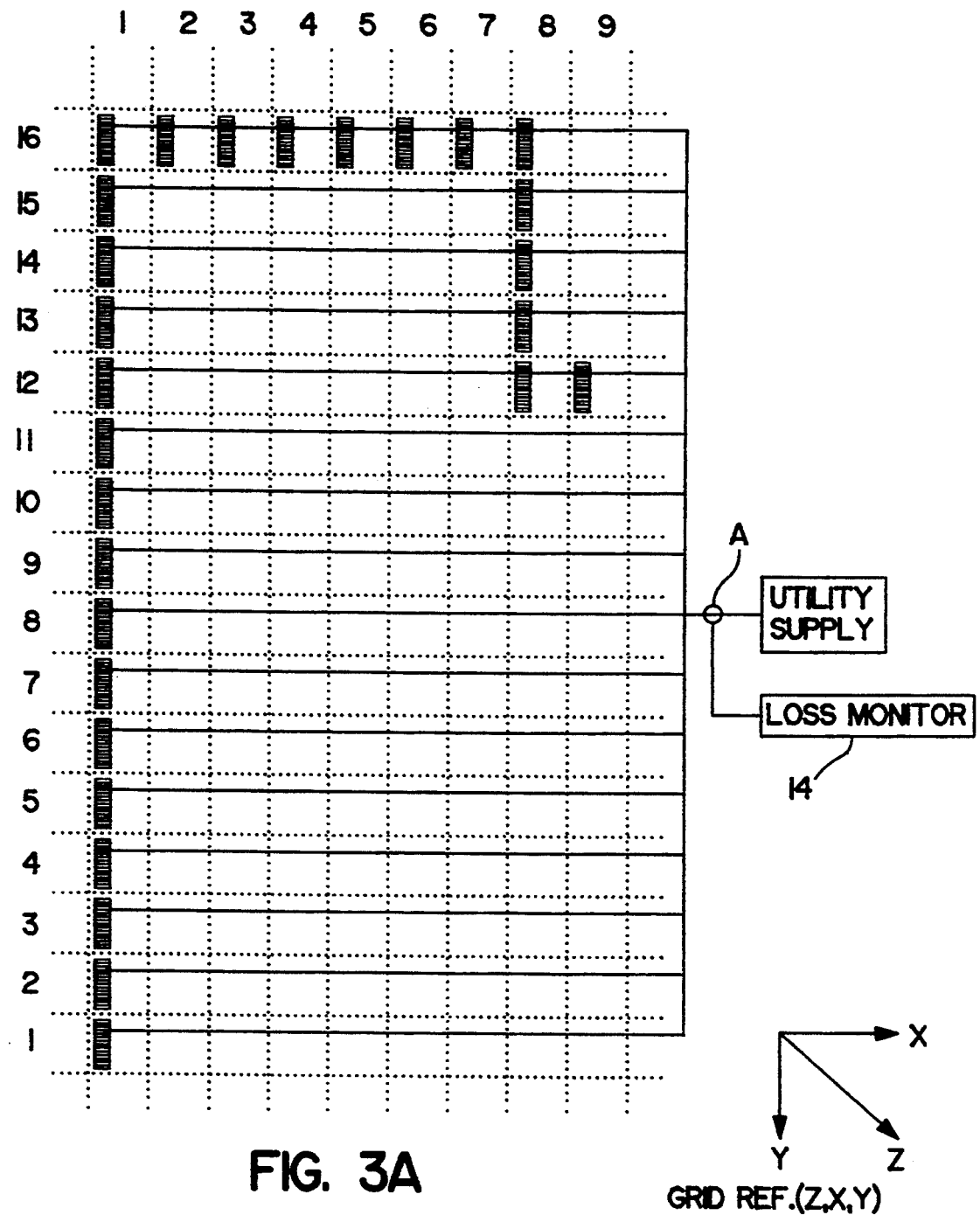
FIGS. 3A and 3B indicate alternative implementations of the invention.
Figure 3B:
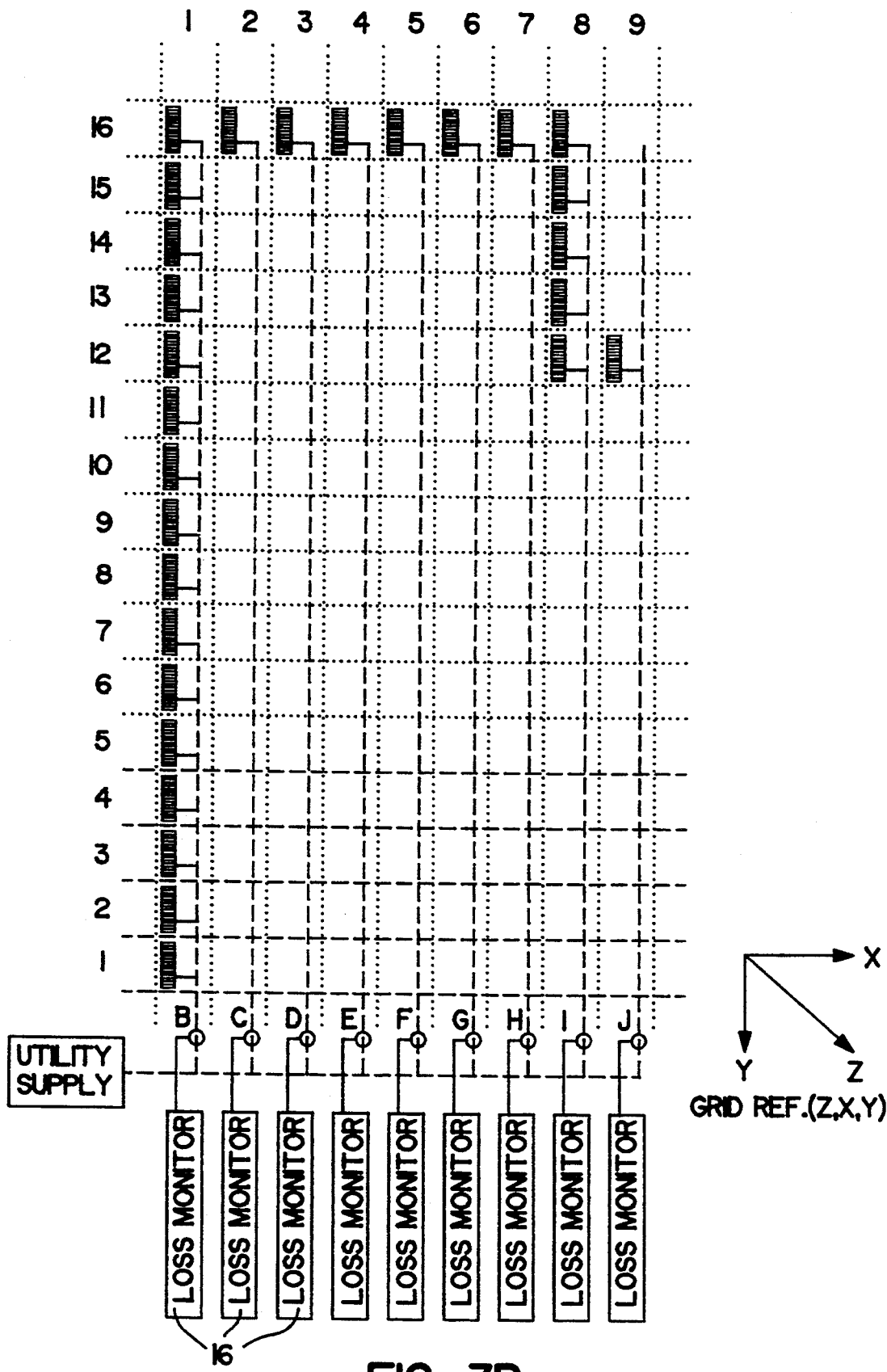

FIGS. 3A and 3B show two extensions of the ideas outlined above, and which take account of losses which occur in the distribution or usage of the utilities.

In each case, monitoring units are included at various points in the distribution network of each utility to measure the amount of utility actually supplied to that point. This figure can be compared with the actual consumption metered in the zones supplied through that point in order to determine any losses which may be occuring in the distribution network.

In FIG. 5A, the utility is supplied to the premises at a single point A from which the utility is distributed to all of the zones on the premises. A single monitoring device 14 at A records the amount of the utility supplied to the premises and supplies the information to the analysis means 120. Thus, the total losses which occur between the point A and the utility loads in the zones can be determined.

In a more sophisticated arrangement shown in FIG. 3B, separate loss monitoring apparatus 16 is supplied for each column of zones. It is therefore possible to determine the losses which occur in any single column so that, for instance, appropriate action can be taken if losses are excessively high in one column, in relation to losses in another column. Again, this information is reported to the analysis means.

In each case, the losses which are detected are attributed to the zones in which the losses may be occuring, in proportion to the metered consumption in those zones. Thus, if one zone is metered as consuming a utility at twice the rate of another zone, twice as much of the loss will be apportioned to it. Thereafter, the apportioned losses are treated as additional consumption by those zones, so that calculations such as the total utility consumption in producing a product can correctly reflect associated losses as well as intentional utility usage.

It will be appreciated that because each zone could include more than one utility load, it may be convenient or desirable for the zone to be broken down into subzones, each containing only one utility load, and having associated utility metering means and loss monitoring equipment. Data would then be sent from the sub-zones to control apparatus associated with the whole zone, for onward transmission from the zone to the analysis means. In another arrangement which is envisaged as outlined above, information moves between zones and the analysis means through a group computer associated with a group of zones. Thus, equipment in each zone communicates only with the group computer, and the analysis means communicates with the group computer rather than directly with the apparatus within each zone. The group computer can therefore be programmed to perform preliminary analysis on the data collected from the zones. The group computer may also be programmed and provided with memory sufficient to allow it to run routines for interrogating zones on a regular basis. The provision of storage at the group computer reduces the risk of data being lost as a result of faulty transmission between the group computer and the analysis means.

I claim:

1. A method of monitoring the consumption of utilities in business premises, in which the premises are notionally divided into zones, each of which contains at least one utility load to be supplied, characterized in that said method comprises the steps of:

associating utility metering means with each zone to record utility consumption within the associated zone and provide corresponding utility consumption data;

notionally combining the zones into groups, each group including all of those zones which contribute to the provision of a specified product or service;

and providing analysis means which are operable in relation to each group to provide analysis, said analysis provided in relation to each group comprising the steps of:

(i) receiving the utility consumption data relating to the zones of that group and combining the received data to provide data concerning the total measured utility consumption within that group;

(ii) storing asset data relating to the zones of that group and concerning the expected utility consumption within each of the zones under each of a set of operating conditions, and combining the asset data relating to the zones of that group to provide data concerning the total expected utility consumption within that group;

(iii) comparing the total expected utility consumption data for that group with the total measured utility consumption data for that group; and (iv) supplying control data to a zone or zones within that group to enable utility consumption to be controlled in dependance on the result of the comparison.

2. A method according to claim 1, further characterized in that the zones are notionally combined by providing the analysis means with data identifying the zones which constitute each group.

3. A method according to claim 2, further characterized in that the identifying data may be changed, whereby the groups may be re-organized.

4. A method according claim 1, further characterized in that each zone includes loads for a plurality of utilities, and the utility metering means associated with each zone may record the consumption of each utility within the associated zone.

5. A method according to claim 4, further characterized in that the analysis means are further operable to separately combine data relating to the consumption of each utility within each group of zones, to provide data relating to the total consumption of each utility within each group.

6. A method according to claim 1, further characterized in that the analysis means are further operable to combine all data relating to consumption of any utility within each group of zones, to provide data relating to the total utility consumption of each group.

7. A method according to claim 1, further characterized in that the analysis means are further operable to combine consumption data with tariff data to provide cost data relating to utility consumption costs.

8. A method according to claim 1, further characterized in that there are provided additional utility metering means used to record quantities of a utility supplied to a zone or zones, and wherein the analysis means are further operable to compare the quantity of the utility supplied to the zone or zones and the measured utility consumption within that zone or those zones, to detect losses.

9. A method according to claim 8 further characterized in that the detected losses are apportioned to the zones in which the losses occur, in proportion to the measured consumption within those zones, the apportioned losses being thereafter considered as additional consumption within the zones to which the losses are apportioned.

10. Apparatus for monitoring the consumption of utilities in business premises notionally divided into zones each containing at least one utility load to be supplied, characterized in that the apparatus comprises utility metering means associated with each notional zone of the premises and operable to record consumption within the associated zone, and analysis means operable to analyze consumption data relating to the zones or groups of zones, into which the zones are notionally divided, each notional group including all of those zones which contribute to the provisions of a specified product or service, and characterized in that the analysis means are further operable in relation to each group to:

(i) receive the utility consumption data relating to the zones of that group and to combine the received data to provide data concerning the total measured utility consumption within that group:

(ii) store asset data relating to the zones of that group and concerning the expected utility consumption within each of the zones under each of a set of operating conditions, and combine the asset data relating to the zones of that group to provide data concerning the total expected utility consumption within that group;

(iii) compare the total expected utility consumption data for that group with the total measured utility consumption data for that group; and (iv) supply the control data to a zone or zones within that group to enable utility consumption to be controlled in dependence on the result of the comparison.

11. Apparatus according to claim 10, further characterized in that the analysis means comprises means for storing data identifying the zones which are notionally combined to constitute each group.

12. Apparatus according to claim 11, further characterized in that the identifying data may be changed, whereby the groups may be re-organized.

13. Apparatus according to claim 10, further characterized in that each zone includes loads for a plurality of utilities, and the utility metering means associated with each zone records the consumption of each utility within the associated zone.

14. Apparatus according to claim 13, further characterized in that the analysis means are operable to separately combine data relating to the consumption of each utility within each group of zones, to provide data relating to the total consumption of each utility within each group.

15. Apparatus according to claim 10, further characterized in that the analysis means are operable to combine all data relating to consumption of any utility within each group of zones, to provide data relating to the total utility consumption of each group.

16. Apparatus according to claim 10, further characterized in that the analysis means are operable to combine consumption data with tariff data to provide cost data relating to utility consumption costs.

17. Apparatus according to claim 10, further characterized in that there are provided additional utility metering means operable to record quantities of a utility supplied to a zone or zones, and the analysis means are operable to compare the quantity of the utility supplied to the zone or zones and the measured utility consumption within that zone or zones, to detect losses.

18. Apparatus according to claim 17, further characterized in that the analysis are operable to apportion detected losses to the zones in which the losses occur, in proportion to the measured consumption within those zones, the apportioned losses being thereafter considered as additional consumption within the zones to which the losses are apportioned.

* * * * *